May 1, 1928. 1,668,131

W. E. TRENT

DISTILLING APPARATUS FOR CARBONACEOUS FUEL

Filed Oct. 14, 1922 2 Sheets-Sheet 1

Inventor
Walter E. Trent
By Charles M. Thomas
Attorney

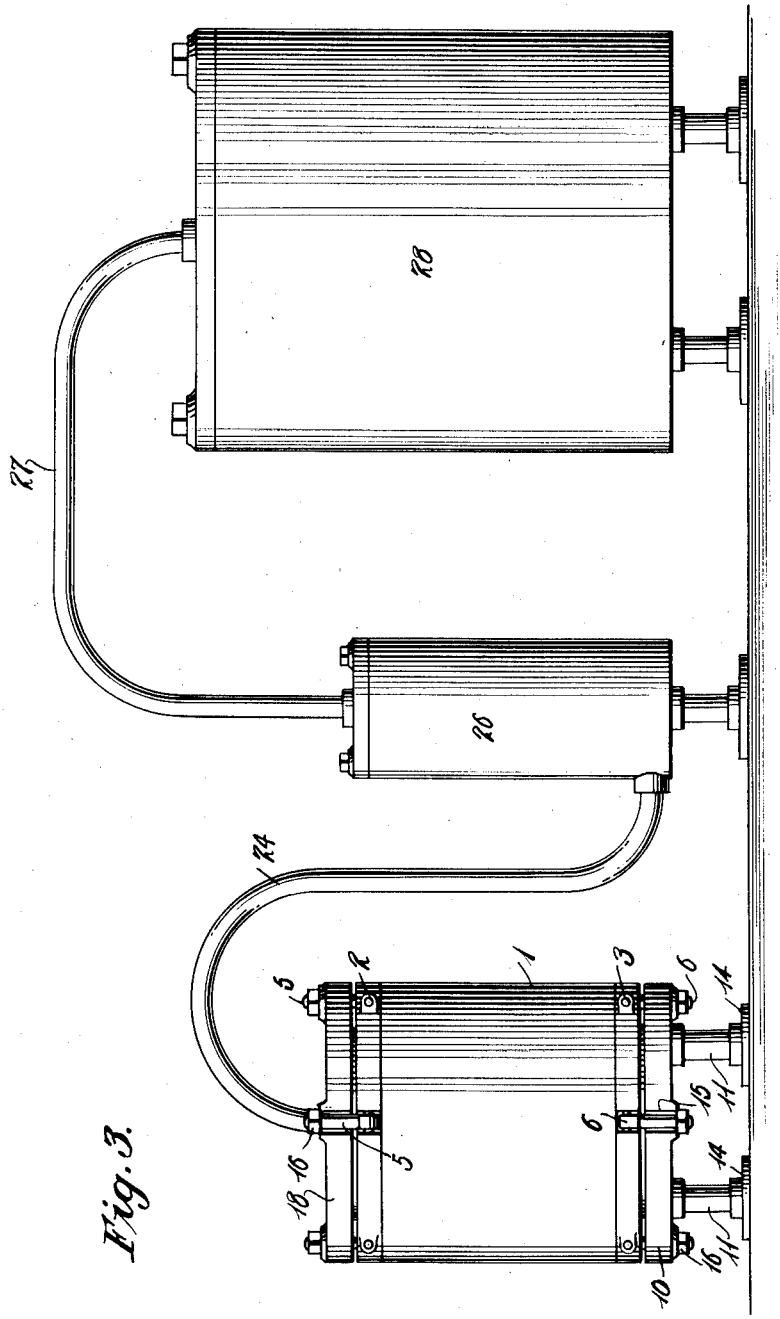

Patented May 1, 1928.

1,668,131

UNITED STATES PATENT OFFICE.

WALTER EDWIN TRENT, OF WASHINGTON, DISTRICT OF COLUMBIA, ASSIGNOR TO TRENT PROCESS CORPORATION, OF NEW YORK, N. Y., A CORPORATION OF DELAWARE.

DISTILLING APPARATUS FOR CARBONACEOUS FUEL.

Application filed October 14, 1922. Serial No. 594,642.

The invention relates to improvements in a gas making and storing apparatus particularly adapted for small consumers and for domestic uses in localities where municipal gas is not available.

It is an object of the invention to provide a gas making apparatus having a generator adapted to receive a charge of carbonaceous fuel, with means contained in said generator for vaporizing the volatile constituents of said charge, which volatile gases are stored for consumption as needed.

In a more specific aspect, the invention contemplates the provision of a gas generating outfit, which may be readily installed in any home or locality and which is so constructed that it may be transported with ease for installation. The casing of the generator receives a charge of comminuted carbonaceous fuel, preferably mixed with oil and of a plastic consistency, having extending therethrough a plurality of corded openings. The generator is provided with a heater capable of developing sufficient heat to vaporize the volatile constituents in the fuel mass, which vapors and gases pass on through a scrubber and then into a storage receiver, from where they are consumed as desirable. Only a comparatively small quantity of heat is needed in the generator to develop a large quantity of gas, it being understood that after a charge of the comminuted fuel is introduced to the chamber, the same may be continuously heated until the entire volatile content has been gasified or gases may be intermittently produced from the charge by the control of the heater.

In the accompanying drawings:

Fig. 3 is an elevation of the generator, scrubber and receiver.

Figure 1:
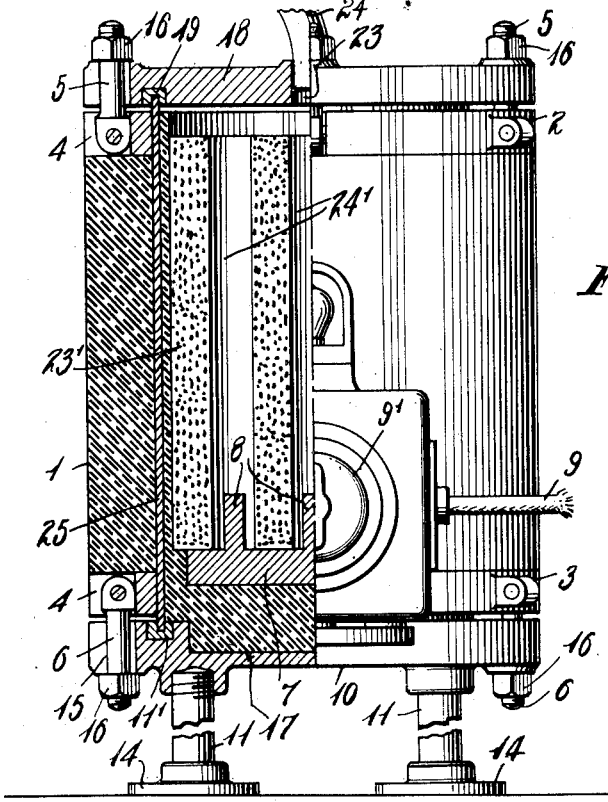
Fig. 1 is an elevation partly in vertical section of the generator.
Figure 2:
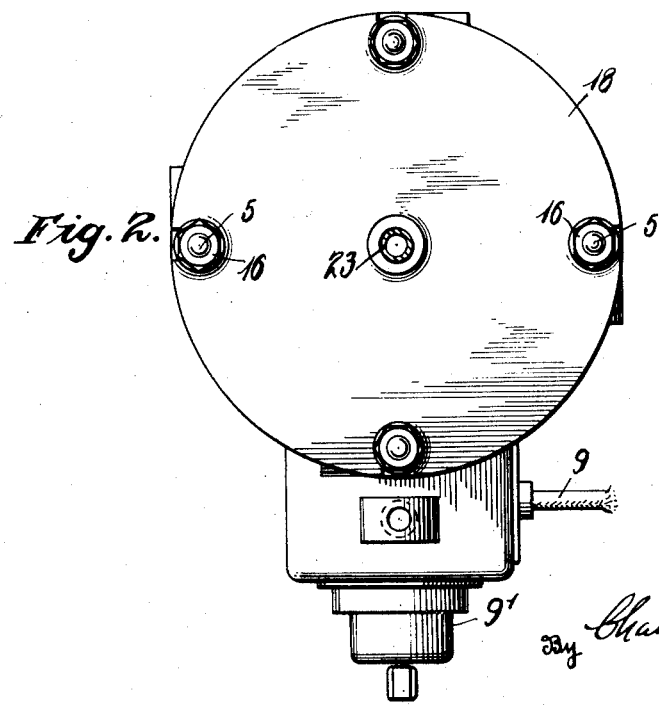
Fig. 2 is a plan view.

Referring now more particularly to the drawings, wherein like reference characters indicate corresponding parts, the numeral 1 designates the body of the gas generator, which is preferably of a composite structure, having an inner metallic wall 25 with inner and outer layers of insulating material surrounding said wall. The body is disclosed as being of a tubular form, although it will be appreciated that the configuration thereof may vary in any manner found to be desirable. The body of the generator is also preferably formed with upper and lower pintles 2 and 3 respectively secured to an annular member surrounding the upper and lower ends of said generator body. These pintle members 2 and 3 constitute pivots for the fastening bails 5 and 6 to which they are attached.

Disposed within the generator body 1 there is an electric grid 7 formed of any suitable material and insulated from said body. Said grid is shown as extending across the body at the lower end thereof, but its configuration may, of course, vary. The grid is preferably formed with a plurality of upstanding resistance elements 8 for the purpose of applying heat directly to the walls of the apertures formed in the fuel mass to be later described, causing a rapid penetration of said mass and vaporization of the volatiles therein. The grid is connected to an electrical conductor 9, which conductor is controlled by the electric switch in a housing 9' extending to one side of the generator. The generator body 1 is seated on a separable base 10, having projecting downwardly therefrom the supporting legs 11. The upper ends of the legs enter sockets in the side of the base 10, being preferably connected thereto by complemental threads. The lower portions of the legs engage and carry the supporting feet 14. The base has an upper annular socket therein receiving the packing 11' to provide a firm and non-leaking connection between the side of the generator and the base. Along its periphery the base is also formed with a series of slots 15, receiving the hinge bails 6 carrying the adjustable nuts 16, by means of which the body is firmly united to the base. The lower portion of the base preferably has the cavity 17 therein to receive the insulating material 29 for the grid. The generator is also provided with a removable closure 18, preferably of metal or the like, having an annular socket in its under surface receiving a packing 19, which engages the upper edges of the wall of the generator. The closure is maintained in a sealed position by means of the fasteners 5, the shanks of which pass through peripheral openings in said closure. Nuts 16 engage said shanks to maintain the closure in position. The closure is formed with a central gas outlet 23, to which there is connected a tube 24, said tube leading to a gas scrubber 26 of any conventional type where the gases are purified and thence delivered through the pipe 27 to the gas storage receiver 28. From this receiver the gases are used as desired for domestic purposes, or otherwise.

Within the body of the generator I place a composite fuel charge 23', preferably a plastic mass of fine coal and hydrocarbon oil, having vertical passageways 24' extending therethrough. This fuel mass has been found by me to be most desirable in the manufacture of gas, and is produced in the manner disclosed in my Patent No. 1,420,163, dated June 20, 1922. This fuel mass rapidly yields its volatiles when the switch 9' is turned on and the grid 7 heated. The heat generated by this grid, or an equivalent heater, passes into the passageways 24' and rapidly attacks the walls thereof, vaporizing the volatile content of the mass. These volatile gases are produced in substantial quantities by the use of little heat by the grid 7 and constitute a gas of a very high heating value. They discharge through the pipe 24 into the scrubber 26 and then pass into the receiver where they are collected for subsequent use. When a fuel charge has been largely robbed of its volatile content, a coke residue is formed in the generator, which is then removed from the generator and a new mass of green fuel substituted in its place. The coke removed can be employed for use wherever a fuel of this character is desired.

Having thus described my invention, what I claim is:

1. In a batch distilling apparatus for generating gas and producing coke, a heat insulated gas generating chamber adapted to receive a charge of solid carbonaceous fuel, a removable base for said chamber, a removable closure for said chamber, an electric grid seated on said base and insulated therefrom having upstanding heating elements projecting upwards therefrom into said chamber, for removing volatiles from the fuel and producing a residue of coke, means for conveying gases from said chamber and means for permitting the removal of the coke.

2. In a batch distilling apparatus for generating gas and producing coke, a gas generating chamber adapted to receive a charge of solid carbonaceous fuel and having a base, an electric grid seated on the base thereof having upstanding heating elements projecting upwards therefrom into said chamber for removing volatiles from the fuel and producing a residue of coke, means for permitting the removal of the coke from the chamber, and means for conveying gases from said chamber.

3. In a batch distilling apparatus for generating gas and producing coke, a heat insulated gas generating chamber, a removable base for said chamber, a removable closure for said chamber, an electric grid seated on said base and insulated therefrom, said grid being adapted to support a briquette of carbonaceous material having formed passageways therein extending therethrough to receive said upstanding elements projecting from said grid, and means for conveying gases from said chamber.

4. In a batch distilling apparatus for generating gas and producing coke, a gas generating chamber, an electric grid seated on the base thereof having upstanding heating elements projecting upwards therefrom, said grid being adapted to support a briquette of carbonaceous material, having formed passageways extending therethrough to receive said upstanding elements projecting from said grid to remove volatiles from the fuel charge and producing a residue of coke, means permitting the removal of coke from the generating chamber, and means for conveying gases from said chamber.

5. In a batch distilling apparatus for generating gas and producing coke, a heat insulated gas generating chamber adapted to receive a charge of solid carbonaceous fuel, said chamber having a base, a removable closure for said chamber, an electric grid seated on said base and insulated therefrom serving to remove volatiles from the fuel charge and produce a residue of coke, means permitting the removal of the coke from the apparatus, and means for conveying gases from said chamber.

In testimony whereof I affix my signature.

WALTER EDWIN TRENT.